United States Patent [19]

Delvin

[11] Patent Number: 4,894,514
[45] Date of Patent: Jan. 16, 1990

[54] HEATED TRANSPARENCY WITH MALFUNCTION DETECTION MEANS

[75] Inventor: Wayne A. Delvin, New Kensington, Pa.

[73] Assignee: PPG Industries, Inc., Pittsburgh, Pa.

[21] Appl. No.: 215,473

[22] Filed: Jul. 5, 1988

[51] Int. Cl.[4] .............................................. H05B 1/02
[52] U.S. Cl. .................................... 219/203; 219/501; 219/497; 219/543
[58] Field of Search ............... 219/202, 203, 205, 209, 219/501, 497, 499, 506, 491, 494, 109, 95, 528, 543, 522

[56] References Cited

U.S. PATENT DOCUMENTS

| | | | |
|---|---|---|---|
| 3,449,551 | 6/1969 | Aisanich | 219/203 |
| 3,475,594 | 10/1969 | Aisanich | 219/202 |
| 3,526,753 | 9/1970 | Aisanich et al. | 219/203 |
| 3,760,157 | 9/1973 | Newman et al. | 219/203 |
| 3,800,121 | 3/1974 | Dean et al. | 219/203 |
| 3,895,213 | 7/1975 | Levin | 219/203 |
| 4,323,726 | 4/1982 | Criss et al. | 219/203 |
| 4,543,466 | 9/1985 | Ramus | 219/203 |
| 4,565,919 | 1/1986 | Bitter et al. | 219/509 |
| 4,596,917 | 6/1986 | Nied et al. | 219/109 |
| 4,668,270 | 5/1987 | Ramus | 219/543 |
| 4,728,768 | 3/1988 | Cueman | 219/95 |

Primary Examiner—M. H. Paschall
Attorney, Agent, or Firm—Dennis G. Millman

[57] ABSTRACT

In a system for electrically heating a transparency, a malfunction in the heating circuit is detected by a Hall effect sensor that detects current changes in a lead to the heating circuit. The sensor is not directly connected to the heating circuit and detects the entire heating current at a location close to the transparency.

4 Claims, 2 Drawing Sheets

HEATED TRANSPARENCY WITH MALFUNCTION DETECTION MEANS

BACKGROUND OF THE INVENTION

This invention relates to an improvement in an electrically heated transparency such as may be employed in a vehicle to provide defrosting, deicing, or defogging capability. In particular, the improvement is in the means to detect discontinuities in the electric circuit in the transparency.

It has been known to pass electric current through a transparent conductive coating on a transparency in order to raise the temperature of the transparency. Generally, a source of electrical potential is connected to the conductive coating by way of a pair of bus bars along opposite sides of the areas of the transparency to be heated. The bus bars have low resistivity relative to the coating and are intended to distribute the current evenly over the area to be heated. The bus bars may be comprised of metallic foil strips, but in the case of glass transparencies they preferably are comprised of a metallic-ceramic frit material fused onto a surface of the transparency. A typical arrangement includes bus bars configured as substantially parallel stripes on opposite sides of the heated area, with electrical leads attached to each bus bar and extending away from the opposite edges of the transparency as shown in U.S. Pat. Nos. 4,323,726 (Criss et al.) and 4,668,270 (Ramus). Locating the leads on the same side of the transparency and preferably closely adjacent to each other is advantageous for the sake of easier installation of the transparency in the vehicle and simplifying the connection with the electrical power source. Therefore, U.S. Pat. Nos. 3,895,213 (Levin) and 4,543,466 (Ramus) provide an extension of one of the bus bars around an end of the transparency so that connections to both bus bars can be made in one relatively compact area.

A crack in a heated transparency can alter the electric heating circuit in ways that can cause further damage to the transparency or have other undesirable effects. A discontinuity in the coating extending with a transverse component to the direction of current flow will increase the overall resistance of the heated area, with the result that power output increases in the unaffected areas. Not only will the heating be ineffective in the damaged area, but also the increased power in the remainder of transparency can raise temperatures to such an extent that the transparency may be thermally damaged. Excessive temperatures can extend propagation of a crack in glass or melt a plastic ply. A break in a bus bar, can radically concentrate the electric power in a small area, depending upon the location of the break. Because of the relatively large amount of current flowing along the bus bars, a defect such as a partial break that increases the resistance of a bus bar is particularly prone to cause localized overheating in the region near the defect. This can occur at any location along the bus bars, but it is particularly serious at locations where a bus bar is carrying the full current or a major portion of the current, such as in an extension leading to a remote bus bar. At high voltage locations, arcing across an open gap in the conductive material can also occur detrimentally. Although arcing is most likely to occur at a bus bar break, it can also occur across a discontinuity in the conductive coating. Another site for potential unbalanced heating or arcing is at the junction of the bus bars with the conductive coating, where the contact may be uneven or separation may occur. Because of the additional harm that overheating or arcing can cause in the transparency when minor damage occurs, it is considered desirable to provide means to detect such an occurrence so as to trigger an alarm device or to automatically remove electrical power from the heating system.

One approach that has been proposed for detecting bus bar breaks in a heated transparency employs a thin electroconductive voltage sensor lead applied to the transparency along with the bus bars. The sensor lead parallels the extension of the upper bus bar along one side of a windshield and contacts the bus bar system at the upper corner where the upper bus bar and the extension meet. External circuitry is provided to detect a voltage change along the extension evidencing a discontinuity in the extension. This approach is limited to detecting breaks in only the extension portion of the bus bars, and although breaks there may have serious consequences, it would be desirable to detect breaks at other locations as well, including the entire bus bar system, the coating, and the contact of the bus bars with the coating.

Additionally, arrangements that rely on detecting voltage changes are susceptible to false alarms due to fluctuations in the applied voltage due to varying loads on the power supply by other accessories. It would be desirable for a detection system to be less affected by extraneous voltage fluctuations.

Measuring current changes by means of an induction coil arrangement associated with a power lead extending to the heated transparency can be accomplished only with an alternating current lead. However heated transparencies in automotive applications are commonly supplied with direct current rectified from an alternating current power source. Therefore, measuring current changes inductively requires the measurement to be made at the power source itself (the alternator in an automobile) ahead of the rectifier and remote from the transparency itself. This separation between the transparency and the current detector diminishes the degree of sensitivity with which current changes associated with malfunctions of the heated transparency can be detected. It would be desirable to have the current change detecting means more closely associated with the transparency itself. Additionally, an induction coil current sensing device in a typical automobile power supply having three phase alternating current would conventionally be associated with a single phase lead, and thus would be measuring only a portion of the current. For maximum sensitivity it would be desirable to detect changes in the total current flow through the heating circuit.

SUMMARY OF THE INVENTION

In the present invention, an improvement in discontinuity detection for electrically heated transparencies is provided wherein changes in heating circuit resistance are determined by monitoring the entire direct current flowing between the rectifier of the power supply and the transparency. Changes in the direct current are detected by a Hall effect sensor device, which does not require connection to the heating circuit and which puts an insignificant load on the circuit. This arrangement permits discontinuities to be detected with a high level of sensitivity because the entire current being supplied to the transparency is monitored and the point of detection can be closely adjacent to the transparency, thereby minimizing sources of extraneous interference.

More specifically, the invention may be embodied as a Hall effect current sensor device mounted in a toroidal holder assembly through which passes the electrical power lead to the transparency heater circuit, a voltage regulator, and an amplifier for generating an output signal in response to a predetermined change in the output of the Hall effect device.

THE DRAWINGS

FIG. 1 is a schematic depiction of a heated transparency, a power source, and current change detecting means incorporating an embodiment of the invention.

FIG. 2 circuit diagram illustrating the use of a Hall effect sensor device with an example of a current change sensing circuit to detect malfunctions in the heated transparency of FIG. 1.

FIG. 3 is a circuit diagram of an alternate embodiment for a malfunction dectector circuit.

DETAILED DESCRIPTION

The description of the preferred embodiment herein is in reference to a laminated transparency comprised of two plies of glass bonded together by an interlayer of plastic since that is the typical windshield construction. But it should be understood that the invention can apply to transparencies involving a single ply of glass with a single ply of plastic, all plastic laminations, and other combinations involving numerous plies. The transparency need not be intended for use as an automobile windshield, but may be any window for a vehicle or other enclosure, including aircraft.

Figure 1:
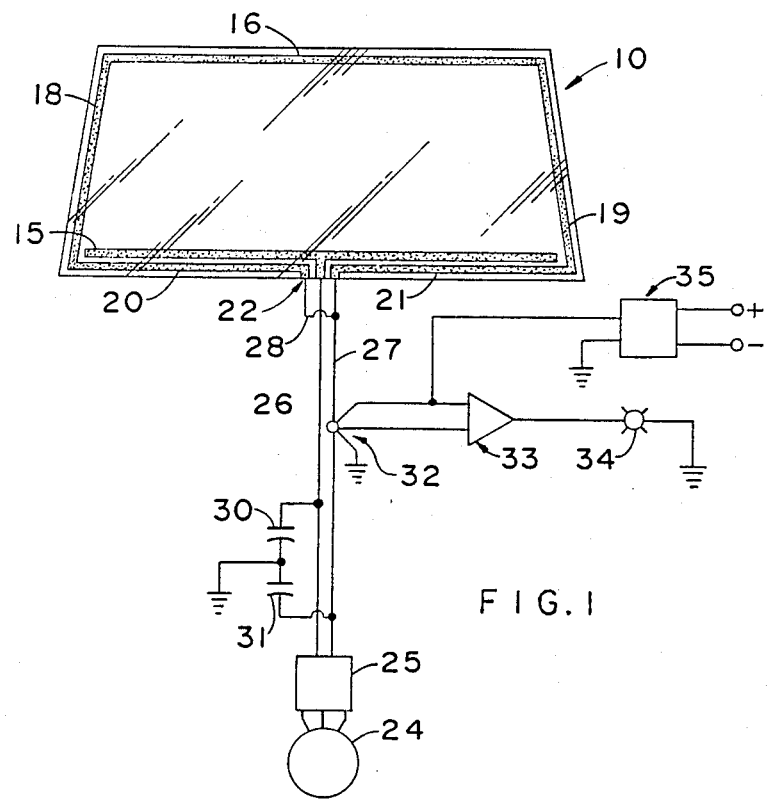

In the example shown in FIG. 1 the transparency 10 is comprised of an outboard glass sheet, a plastic interlayer which may be polyvinylbutyral as is commonly used for laminated windshields or other suitable interlayer material, and an inboard sheet of glass. An electroconductive coating is preferably placed on a surface that is not exposed, most preferably on the inboard side of the outboard glass sheet. Various coatings may exhibit the combination of transparency and electroconductivity to serve as the heating element for a windshield or the like, but a preferred coating is that disclosed in U.S. Pat. No. 4,610,771 (Gillery), the disclosure of which is hereby incorporated by reference. That coating comprises a film of silver between films of zinc stannate, each of which may be applied sequentially by magnetron sputtering. The silver acts as the conductive layer and the zinc stannate films serve to mask the reflectance of the silver. The coating exhibits appropriate resistivity for use as a heated windshield when the silver layer has a thickness of about 110 angstroms, for example.

With continued reference to FIG. 1, a bottom bus bar 15 and top bus bar 16 are in contact with the coating. Marginal edge portions edge of the coating along the side and bottom edges of the transparency may be deleted, leaving an uncoated margin along three sides thereof. The uncoated marginal areas permit connections to be made to the upper bus bar 16 without contact with the coating. As shown in FIG. 1, the electric power connection to the upper bus bar consists of conductive side extension strips 18 and 19 extending along opposite side edge portions and bottom extension strips 20 and 21. The lower bus bar 15 and the upper bus bar extensions may terminate closely adjacent to each other at a terminal region 22 which, i the typical embodiment illustrated, is located at the center of the bottom edge of the transparency. A common terminal area for all of the circuit lines is preferred for the sake of convenient installation in a vehicle, but is not essential to all aspects of the present invention. It should also be apparent that the terminal region could be off-center or on other edge portions of the transparency. Suitable electroconductive bus bar materials are well known in the art, typically comprising a ceramic frit material containing a metal such as silver, which may be applied to the substrate in slurry form by silk screening in the desired pattern. The frit is then fused by heating, either in a separate step or as part of a bending operation, thereby fixing the electroconductive pattern onto the substrate. The conductivity of the bus bars is chosen to be considerably greater than that of the coating.

As shown in FIG. 1, a source of electrical power may be connected to the bus bars by way of electrical leads 26 and 27 which contact the respective bus bars in the terminal region 22 of the transparency. A jumper lead 28 joins both extension 20 and 21 of the upper bus bar in common to one pole of the power source. The power source in an automobile typically includes an alternator 24 that generates three-phase alternating current and a rectifier 25 that converts the current to single-phase direct current. Noise suppression may be provided by grounded capacitors 30 and 31 between the leads 26 and 27.

In order to sense a change in current flowing to the heated transparency that would indicate a change in resistance in the heating circuit, the present invention employs a Hall effect sensing device 32 in close proximity to either of the leads 26 or 27. The Hall effect is a well known principle wherein a thin rectangle of semiconductor material carrying a constant current develops a potential difference in the direction transverse to the constant current when lines of a magnetic field impinge perpendicularly onto a face of the rectangle. The transverse voltage is proportional to the magnetic flux density and therefore can be used to measure the strength of the magnetic field. A current passing along a wire generates a magnetic field around the wire, the strength of which is proportional to the amount of current. In the present invention the Hall effect sensor 32 measures the magnetic field around the lead wire 27 and is sensitive to a change in the magnetic field that would accompany a change in the current. A trigger circuit shown schematically as an amplifier 33 in FIG. 1 generates an output signal to activate a warning signal device such as a light 34 in response to a predetermined amount of change sensed by the Hall effect device commensurate with damage to the heating circuit. Another component of the system shown in FIG. 1 is a voltage regulator 35 which applies a constant current to the Hall effect device 32 and provides a reference voltage to the trigger circuit 33.

Figure 2:
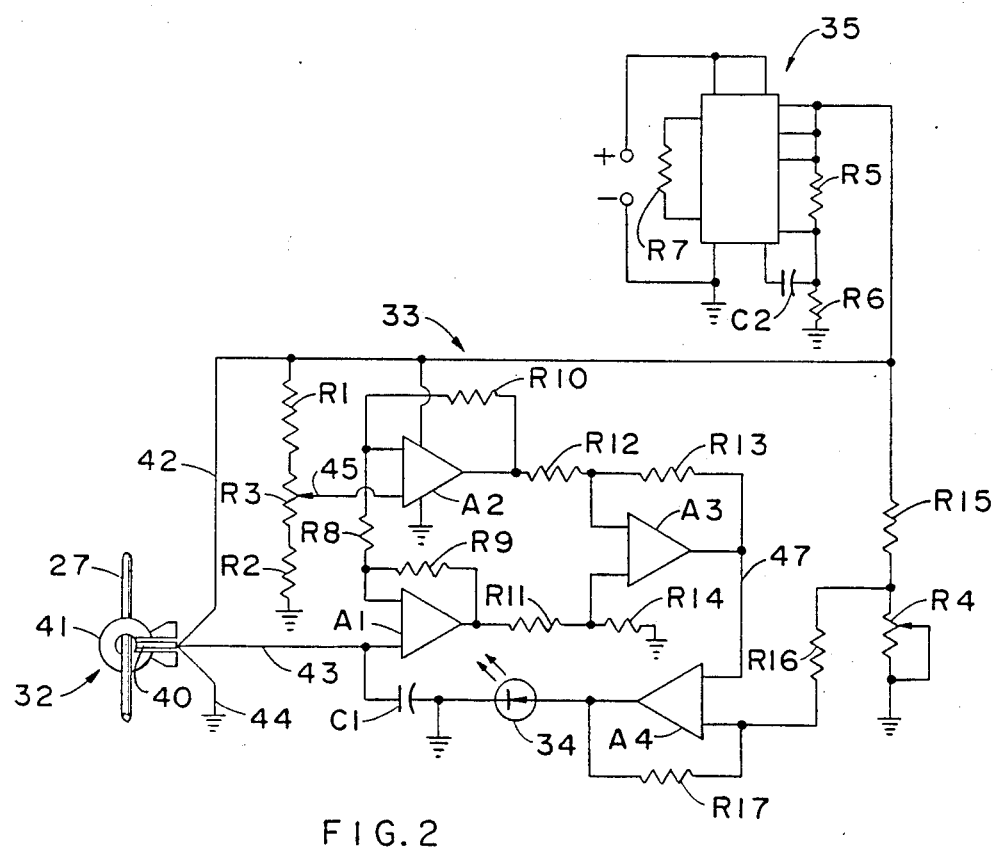

Details of a specific, preferred embodiment of the detection circuitry are shown in FIG. 2. The Hall effect sensor 32 is comprised of a solid state chip 40 held in a slot in a toroidal holder assembly 41. The toroidal core of the holder assembly 41 is ferromagnetic and serves to concentrate the magnetic flux lines on the sensor chip 40. The lead wire 27 carrying the current being measured passes through the center of the toroidal holder 41 and may be wound around the core and through the center several times (not shown) to increase the amount of magnetic flux directed to the sensor. An example of a suitable sensor chip is Micro Switch 9SS (LOHET I) in holder assembly CSLA1CD, both sold by Micro Switch division of Honeywell, Freeport, Ill.

The Hall effect sensor chip 40 has three separate leads. Lead 42 supplies the constant current to the sensor device from the voltage regulator 35. Lead 43 carries the output from the sensor to the trigger circuit 33. Lead 44 is grounded. The output voltage from the Hall effect sensor on lead 43 is approximately fifty percent of the applied reference voltage on lead 42 when current is passing along the windshield heating circuit lead 27. The reference voltage provided to the trigger circuit 33 by way of lead 45 is adjusted to equal the normal output from the Hall effect sensor by potentiometer R3.

The four amplifiers A1, A2, A3, and A4 may comprise a single integrated circuit of the type known as a low power quad operational amplifier such as National Semiconductor LM324 or LM124. Amplifiers A1, A2, and A3 function as a high input, Z adjustable gain, direct current, instrumentation amplifier which measures the difference between the Hall effect sensor output and the adjusted reference voltage on lead 45 (amplifiers A1 and A2) and sends an amplified signal (amplifier A3) to amplifier A4 via lead 47. The amplifier A4 compares the operational signal from amplifier A3 with a reference voltage, and when the signal exceeds the reference voltage amplifier A4 triggers an output signal to a warning device such as light emitting diode 34. The reference voltage, and therefore the sensitivity of amplifier A4 to trigger a warning signal, is set by potentiometer R4. Capacitor C1 filters noise that may be in the system from extraneous sources.

The voltage regulator 35 may comprise an integrated circuit such as National Semiconductor LM 723 CN. Resistors R5 and R6 and capacitor C2 determine the output voltage of the regulator, which may for example be about 10 volts direct current. Resistor R7 compensates for temperature variations. The input to the voltage regulator may be a direct current voltage source of 12 volts or greater.

In a specific embodiment of the circuit shown in FIG. 2, the components have the following values:

| Resistors | Ohms | Capacitors | Farads |
|---|---|---|---|
| R1 | 10K | C1 | 150 μf |
| R2 | 10K | | |
| R3 | | C2 | 100 pf |
| R4 | 2K | | |
| R5 | 1.8K | | |
| R6 | 4.7K | | |
| R7 | 1.2K | | |
| R8 | 10K | | |
| R9 | 100K | | |
| R10 | 100K | | |
| R11 | 100K | | |
| R12 | 100K | | |
| R13 | 100K | | |
| R14 | 100K | | |
| R15 | 500K | | |
| R16 | 10K | | |
| R17 | 10 M | | |

The voltage applied to the windshield heating circuit may be taken as constant. Therefore, an increase in resistance due to a discontinuity in the electroconductive film or in the bus bars will result in a decrease in the current flowing through the heating circuit. The decreased current in the heating circuit will be reflected by a reduction in the output voltage from the Hall effect sensor 32. The amount of change in the output voltage is measured by the trigger circuit 33, and if amplifier A4 detects that the magnitude of the change is greater than the preset reference, a warning signal is generated. The preset reference voltage may vary considerably in accordance with individual requirements, but in general should be set as low as possible to provide maximum sensitivity without causing false alarms due to normal variations such as temperature changes. To avoid a false alarm when the heating circuit is being turned on, it may be desirable to include a delay circuit (not shown) to delay activation of the detector circuit until after the heating circuit reaches a steady state.

Figure 3:
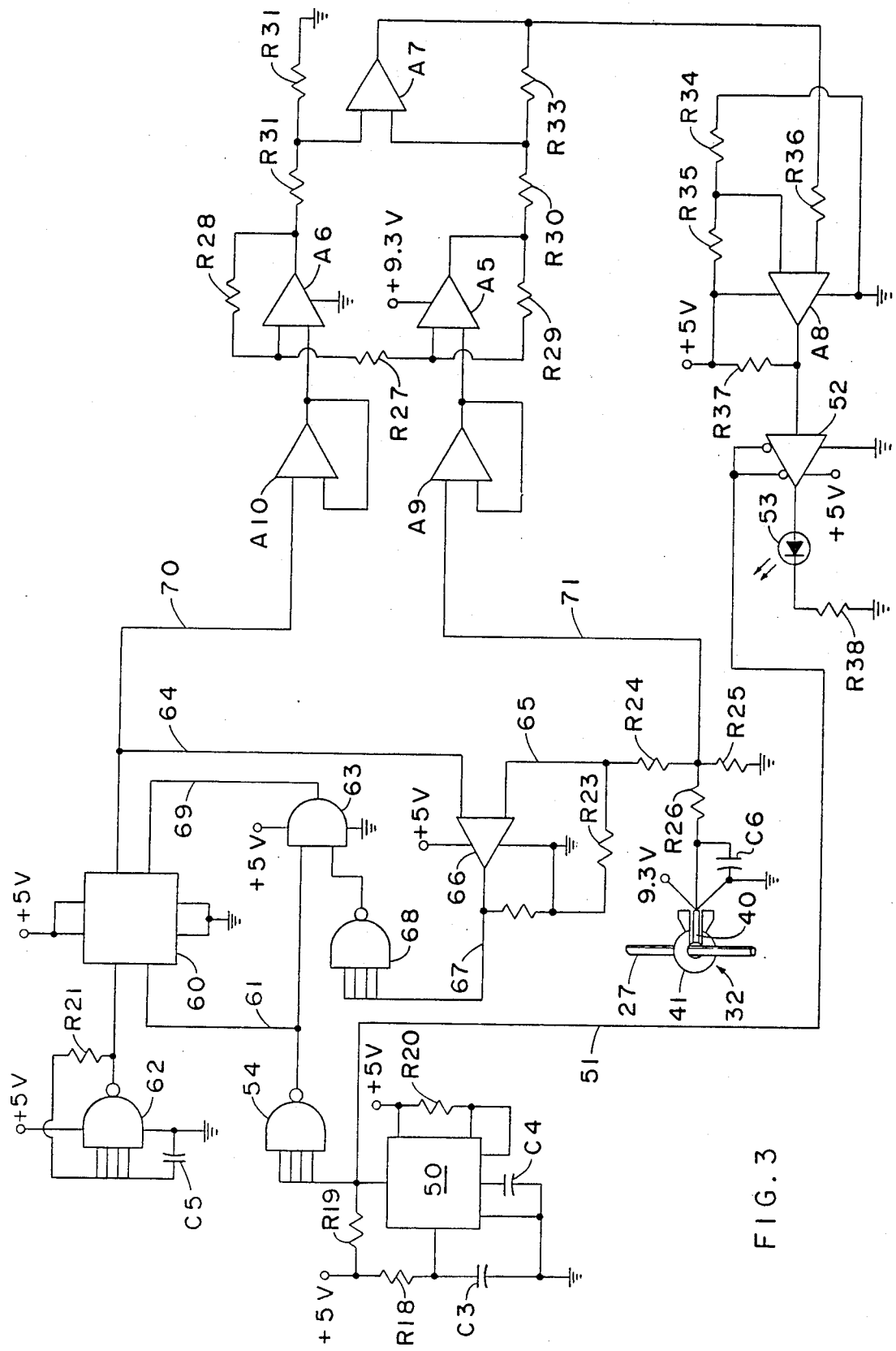

An alternative embodiment for a trigger circuit is shown in FIG. 3. The additional circuitry of the FIG. 3 embodiment provides automatic calibration, start-up time delay, and additional freedom from erratic signal fluctuations. When power is applied to the circuit an integrated circuit timer 50 delays (e.g., about ten seconds) before activating the trigger circuit. At the conclusion of the delay period, the timer 50 via lead 51 activates a tri-state buffer 52 so that only then may the warning device, such as light emitting diode 53, be triggered. At the same time the timer 50 sends a signal to a four input "nand" gate 54 used as an inverter, which in turn sends a signal to a digital potentiometer 60 via lead 61 whereby the digital potentiometer is activated to progressively decrease resistance in small steps in response to pulses received from an oscillator 62. The oscillator 62 may be comprised of a four input "nand" gate wired in an RC arrangement as shown which may, for example, oscillate at about 100 Hz. The inverter 54, after receiving a signal from the timer 50, also enables one side of a two input "and" gate 63. As long as only one side of the "and" gate 63 is enabled, the digital potentiometer 60 continues to incrementally increase resistance and to provide an output on lead 64 of correspondingly increasing voltage. The voltage on lead 64 is compared with one half the output voltage from the Hall effect sensor 32 on lead 65 by means of a comparator 66. When the voltage on lead 64 approaches that on lead 65, the output from comparator 66 on lead 67 goes low, which causes four input "nand" gate inverter 68 to send a signal enabling the second side of the "and" gate 63. The output from the "and" gate 63 on lead 69 then signals the digital potentiometer to stop scanning, which fixes the output voltage from the digital potentiometer at approximately the same voltage as one half the output from the Hall effect sensor. This fixed reference voltage is fed to the main malfunction detector portion of the circuit via lead 70. The Hall effect sensor output is provided to the detector portion of the circuit by lead 71.

Amplifiers A5, A6, and A7 in FIG. 3 function as a differential operational amplifier and amplifier A8 works as a voltage comparator in essentially the same manner as the amplifiers A1, A2, A3, and A4 in the embodiment of FIG. 2, whereby a difference between the reference voltage on lead 70 and the sensor output voltage on lead 71 will generate an amplified output signal to be sent to a warning device such as a light emitting diode 53 via the tri-state buffer 52. Amplifiers A9 and A10 are operational amplifiers used as a buffer to smooth the signals being fed to the detector portion of the circuit from the Hall effect sensor and the reference voltage respectively. The sensitivity of amplifier A8 to the level of input that will trigger an output is determined by resistors R34 and R35.

Power is supplied to the circuit of FIG. 3 at nominally 5 volts and 9.3 volts at the terminals indicated on the drawing. Two voltage regulators (not shown) may be used to provide the two voltages, drawing from the vehicle power supply.

In a specific example the circuit of FIG. 3 may be embodied with the following components:

| Resistors | Ohms | Resistors | Ohms |
| --- | --- | --- | --- |
| R18 | 1 M | R29 | 100K |
| R19 | 1.2K | R30 | 100K |
| R20 | 10 M | R31 | 100K |
| R21 | 330 | R32 | 100K |
| R22 | 240 | R33 | 100K |
| R23 | 10 M | R34 | 120 |
| R24 | 10K | R35 | 1K |
| R25 | 10K | R36 | 10K |
| R26 | 10K | R37 | 10K |
| R27 | 2K | R38 | 730 |
| R28 | 100K | | |

| Capacitors | Farads |
| --- | --- |
| C3 | 0.1 µf |
| C4 | 0.01 µf |
| C5 | 25 µf |
| C6 | 1 µf |

| Integrated Circuits | Part Number | |
| --- | --- | --- |
| Timer 50 | LM555CN | National Semiconductor |
| Gate 54 | DM7413 | National Semiconductor |
| Gate 62 | DM7413 | National Semiconductor |
| Gate 63 | DM7411 | National Semiconductor |
| Gate 68 | DM7413 | National Semiconductor |
| Amps 66, A9, A10 | LM324N | National Semiconductor |
| Amps A5, A6, A7 | LM324N | National Semiconductor |
| Amp A8 | LM339N | National Semiconductor |
| Buffer 52 | DM74368 | National Semiconductor |
| *-continued* | | |
| Voltage Regulators (2) | LM317T | National Semiconductor |
| Digital Potentiometer 60 | X9104P | Xicor |

Other variations that would be apparent to those of skill in the art may be resorted to without departing from the scope of the invention as defined by the claims that follow.

I claim:

1. An electrically heated transparency system comprising a transparent sheet, a heating circuit associated with the transparent sheet including an electrically conductive coating on a surface of the sheet and bus bars in contact with the coating and extending to a terminal area at a marginal edge portion of the sheet, electrically conductive leads extending from the terminal area to a rectifier section of a power supply means, Hall effect current sensor means electromagnetically coupled to at least one of the leads between the rectifier and the terminal area, the output from the Hall effect sensor connected to operational amplifier means for generating a warning signal in response to a predetermined change in the output from the Hall effect sensor, whereby a change in the resistance of the heating circuit on the transparency is indicated.

2. The system of claim 1 wherein said at least one lead carries all of the current being passed through the coating.

3. The system of claim 1 further including voltage regulator means for providing an input voltage to the Hall effect sensor.

4. The system of claim 1 wherein the amplifier means includes means to adjust the level of predetermined change that generates a warning signal.

* * * * *

UNITED STATES PATENT AND TRADEMARK OFFICE
CERTIFICATE OF CORRECTION

PATENT NO. : 4,894,514
DATED : January 16, 1990
INVENTOR(S) : Wayne L. Devlin

It is certified that error appears in the above-identified patent and that said Letters Patent is hereby corrected as shown below:

On the title page, item (75) inventors:

Correct name is Wayne A. Devlin.
Item (19) "Delvin" should read --Devlin--.

Signed and Sealed this

Twenty-eighth Day of September, 1993

*Attest:*

BRUCE LEHMAN

*Attesting Officer*  *Commissioner of Patents and Trademarks*